(12) United States Patent
Harada et al.

(10) Patent No.: US 11,147,031 B2
(45) Date of Patent: Oct. 12, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/315,461

(22) PCT Filed: Jul. 3, 2017

(86) PCT No.: PCT/JP2017/024286
§ 371 (c)(1),
(2) Date: Jan. 4, 2019

(87) PCT Pub. No.: WO2018/008574
PCT Pub. Date: Jan. 11, 2018

(65) Prior Publication Data
US 2019/0239174 A1 Aug. 1, 2019

(30) Foreign Application Priority Data
Jul. 5, 2016 (JP) .............................. JP2016-133628

(51) Int. Cl.
*H04W 56/00* (2009.01)
*H04L 7/04* (2006.01)
(Continued)

(52) U.S. Cl.
CPC ......... *H04W 56/001* (2013.01); *H04L 5/0082* (2013.01); *H04L 7/00* (2013.01);
(Continued)

(58) Field of Classification Search
None
See application file for complete search history.

(56) References Cited

U.S. PATENT DOCUMENTS

| 9,521,603 B2 | 12/2016 | Yamazaki |
| 2005/0075125 A1* | 4/2005 | Bada ..................... H04W 48/20 455/525 |

(Continued)

FOREIGN PATENT DOCUMENTS

| WO | 2004/059880 A1 | 7/2004 |
| WO | 2010002153 A2 | 1/2010 |
| WO | 2013065834 A1 | 5/2013 |

OTHER PUBLICATIONS

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

(Continued)

*Primary Examiner* — Anez C Ebrahim
(74) *Attorney, Agent, or Firm* — Osha Bergman Watanabe & Burton LLP

(57) ABSTRACT

A future radio communication system (NR) appropriately detects a synchronization signal transmitted in a flexible time and frequency resource. A user terminal includes: a reception section that receives a synchronization signal and/or a common control information channel transmitted in a flexible resource; and a control section that recognizes a resource position at which the synchronization signal is transmitted, based on the synchronization signal or the common control information channel.

5 Claims, 11 Drawing Sheets

(51) Int. Cl.
  *H04W 72/04* (2009.01)
  *H04L 27/26* (2006.01)
  *H04L 7/00* (2006.01)
  *H04L 5/00* (2006.01)

(52) U.S. Cl.
  CPC ............... *H04L 7/04* (2013.01); *H04L 27/26* (2013.01); *H04L 27/2607* (2013.01); *H04W 56/00* (2013.01); *H04W 72/04* (2013.01); *H04W 72/0406* (2013.01); *H04W 72/0446* (2013.01); *H04W 72/0453* (2013.01)

(56) References Cited

U.S. PATENT DOCUMENTS

| | | |
|---|---|---|
| 2006/0003699 A1 | 1/2006 | Gibson et al. |
| 2013/0195069 A1 | 8/2013 | Frederiksen et al. |
| 2013/0250863 A1 | 9/2013 | Nogami et al. |
| 2016/0294528 A1* | 10/2016 | Kim ................ H04L 5/0094 |

OTHER PUBLICATIONS

International Search Report issued for PCT/JP2017/024286, dated Sep. 19, 2017 (3 pages).
Written Opinion issued for PCT/JP20171024286, dated Sep. 19, 2017 (3 pages).
3GPP TSG-RAN WG2 Meeting #50; R2-060051 "E-UTRAN MAC Architecture" Nokia; Sophia Antipolis, France; Jan. 9-13, 2006 (5 pages).
Extended European Search Report issued in European Application No. 17824178.2, dated Jan. 8, 2020 (9 pages).
Office Action in counterpart Russian Patent Application No. 2019101384107(002210) dated Sep. 2, 2020 (10 pages).
Office Action issued in the counterpart European Patent Application No. 17824178.2, dated Dec. 10, 2020 (7 pages).
Office Action in counterpart Chinese Patent Application No. 201780041908.9 dated Mar. 24, 2021 (13 pages).

* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). For the purpose of wider bands and a higher speed than LTE, successor systems of LTE that are called LTE Advanced (LTE-A), Future Radio Access (FRA), the 5th generation mobile communication system (5G) or New Radio Access Technology (New RAT) have been studied.

An existing LTE system (e.g., a system subsequent to LTE Rel. 10) has introduced Carrier Aggregation (CA) that aggregates a plurality of carriers (Component Carriers (CC)) to obtain a wider band. A system band of LTE Rel. 8 is one unit that composes each carrier. Further, according to carrier aggregation, a plurality of component carriers of the same radio base station (eNB: eNodeB) is set to a user terminal (UE: User Equipment).

Furthermore, existing LTE systems (e.g., systems subsequent to LTE Rel. 12) has introduced Dual Connectivity (DC), too, that sets a plurality of Cell Groups (CG) of different radio base stations to user terminals. Each cell group includes at least one carrier (CC, cell). A plurality of carriers of the different radio base stations are aggregated. Therefore, the dual connectivity is also referred to as inter-base station CA (Inter-eNB CA).

Further, existing LTE systems (e.g., LTE Rel. 8 to 13) perform both or one of communication on DownLink (DL) and UpLink (UL) by using Transmission Time Intervals (TTI) of 1 [ms]. This TTI of 1 [ms] is a transmission time unit of one data packet subjected to channel coding, and is a processing unit of scheduling and link adaptation. The TTI of 1 [ms] is also referred to as a subframe or a subframe length.

CITATION LIST

Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (e.g., 5G and NR) are requested to accommodate various types of service such as high-speed and large-volume communication (eMBB: enhanced Mobile Broad Band), massive connection (massive MTC) from Internet of Things (IoT) devices or Machine-to-Machine communication (M2M) devices such as Machine Type Communication (MTC), or low-latency and highly reliable communication (URLLC: Ultra-reliable and Low Latency Communication) in a single framework.

Thus, the future radio communication systems are assumed to include a plurality of services having different requests for latency reduction in a mixed manner. Hence, the future radio communication systems are demanded to accommodate a plurality of user terminals of different numerologies (that are also referred to as multiple numerologies). In this regard, each numerology refers to a communication parameter (e.g., a subcarrier spacing, a bandwidth, a symbol length, a Cyclic Prefix (CP) length, a TTI length, the number of symbols per TTI, a radio frame arrangement, filtering processing and windowing processing) in both or one of a frequency direction and a time direction.

The future radio communication systems that accommodate a plurality of user terminals of the different numerologies have a problem of how to transmit a synchronization signal.

The present invention has been made in light of such a problem. An object of the present invention is to provide a user terminal and a radio communication method that can appropriately detect a synchronization signal transmitted in flexible time and frequency resources in a future radio communication system (NR).

Solution to Problem

A user terminal according to the present invention includes: a reception section that receives a synchronization signal and/or a common control information channel transmitted in a flexible resource; and a control section that recognizes a resource position at which the synchronization signal is transmitted, based on the synchronization signal or the common control information channel.

Advantageous Effects of Invention

The present invention can appropriately detect a synchronization signal transmitted in flexible time and frequency resources in a future radio communication system (NR).

DESCRIPTION OF EMBODIMENTS

Figure 1:
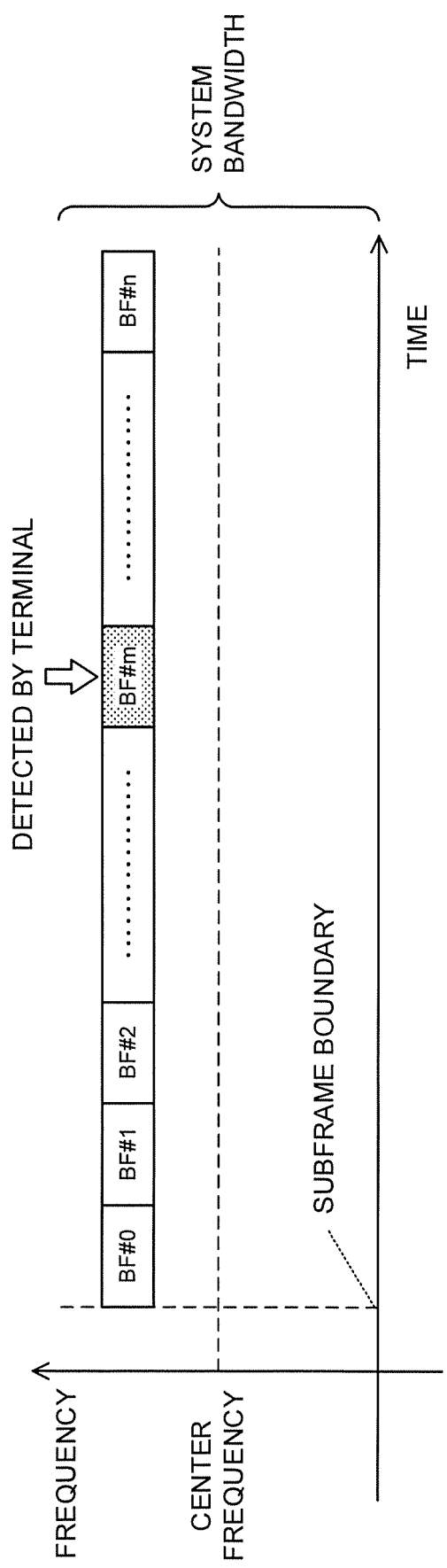
FIG. 1 is a diagram illustrating an example where an NR synchronization signal is transmitted in a frequency resource other than a center in a system bandwidth and one of time resources.

A radio access scheme (5G RAT) of future radio communication systems assumes introduction of a plurality of numerologies (also referred to as multiple numerologies) to support a wide range of frequency bands and various services of different request conditions. In this regard, the numerology refers to a set of communication parameters (radio parameters) in both or one of a frequency direction and a time direction. The communication parameter set may include at least one of, for example, a subcarrier spacing, a bandwidth, a symbol length, a CP length, a TTI length, the number of symbols per TTI, a radio frame configuration, filtering processing and windowing processing.

"Different numerologies" mean that at least one of a subcarrier spacing, a bandwidth, a symbol length, a CP length, the TTI length, the number of symbols per TTI and a radio frame configuration is different between numerologies, yet are not limited to this. The future radio communication systems that support the multiple numerologies are configured to be able to accommodate a plurality of user terminals of different numerologies.

Downlink Physical Broadcast Channels (PBCH) including a synchronization signal (PSS/SSS: Primary Synchronization Signal/Secondary Synchronization Signal) and a Master Information Block (MIB) according to LTE are transmitted by fixed time frequency resources in a radio frame at all times. A user terminal can synchronize with a radio frame timing by detecting the PSS/SSS, and can decode the PBCH without advance information of a bandwidth.

It has been studied to transmit a synchronization signal (NR SS) and an MIB of the future radio communication systems (NR) on flexible resources by taking into account a probability of addition of a new service or function in future release, i.e., forward compatibility. In this regard, the synchronization signal (NR SS) and the MIB of the future radio communication systems (NR) may be identical or non-identical to the synchronization signal and the MIB according to LTE.

Taking into account an NR carrier such as a high frequency whose propagation attenuation is great and whose coverage is difficult to secure, it has been considered to apply beam forming or another coverage compensation technique to synchronization signals. For an initial access signal such as a synchronization signal or a random access channel or system information, for example, both of a multi-beam based approach and a single-beam based approach have been considered. An NR synchronization signal needs to be transmitted by the multi-beam based approach while sweeping beams between a plurality of time resources. In this case, the user terminal detects only a synchronization signal transmitted by a beam directed toward a direction of the own terminal.

Placing a frequency resource for transmitting the NR synchronization signal (NR SS) at the center of the system bandwidth at all times is likely to cause a problem from a viewpoint of forward compatibility since there is no flexibility. By contrast with this, enabling transmission of the NR synchronization signal from any resource of the system bandwidth increases a processing load for searching the NR synchronization signal in the user terminal. Further, when the NR synchronization signal is enabled to be transmitted by a frequency resource other than the center of the system bandwidth (see FIG. 1), the user terminal needs to recognize a frequency resource index or a shift from the center of the system bandwidth to perform post-processing such as MIB reception, Physical Random Access Channel (PRACH) transmission or Radio Resource Management (RRM) measurement.

When the NR synchronization signal is transmitted by the multi-beam based approach, if the NR synchronization signal is transmitted by sweeping beams between a plurality of time resources, the user terminal detects the NR synchronization signal transmitted by one of the time resources (see FIG. 1). The user terminal needs to recognize a time resource index and a shift from a subframe head to perform post-processing such as the MIB reception, the PRACH transmission or the RRM measurement.

Therefore, the inventors of the invention have arrived at the present invention by studying methods for recognizing and notifying a synchronization signal resource position or an index when the future radio communication systems (NR) enable transmission of a synchronization signal by a flexible time resource and frequency resource. Further, the inventors of the invention have arrived at the present invention by studying a method for realizing detection processing of a user terminal accompanying transmission of the synchronization signal in the flexible time and frequency resources, with a low degree of complexity and a low load.

(First Aspect)

In the first aspect, a user terminal transmits a synchronization signal sequence while enabling recognition of a synchronization signal resource position (a shift amount from a reference position) by detecting a synchronization signal. That is, the user terminal is implicitly notified of the resource position by a synchronization signal sequence pattern.

Embodiment 1-1

Cyclic shift in subcarrier units is applied to map a synchronization signal sequence on each subcarrier. A cyclic shift amount is changed according to a synchronization signal resource position, i.e., a shift amount of a time or frequency resource from a reference position.

Figure 2A:
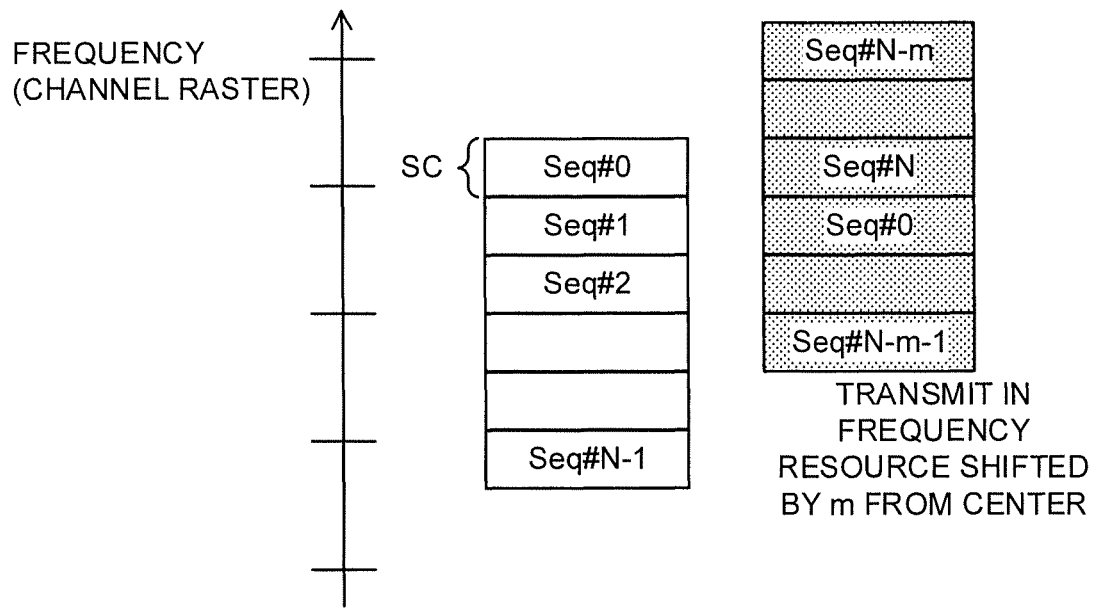
FIG. 2A is a diagram for explaining an embodiment 1-1.

As illustrated in FIG. 2A, when a synchronization signal is transmitted by a center resource block, the cyclic shift is not applied. In an example illustrated in FIG. 2A, sequences #0 to #N−1 are mapped on subcarriers in order, and transmitted.

As illustrated in FIG. 2A, when a synchronization signal is transmitted by a frequency resource shifted by m from the center, cyclic shift corresponding to m is applied in subcarrier units. That is, the cyclic shift corresponding to m is applied to notify a user terminal of how much subcarrier is shifted from the center. By receiving the synchronization signal to which the cyclic shift corresponding to m has been applied in the subcarrier units, the user terminal can recognize the synchronization signal resource position, i.e., the shift amount of the frequency resource from the reference position (e.g., a carrier center frequency).

Embodiment 1-2

Cyclic shift is applied in resource block units to map a synchronization signal sequence on each subcarrier. A cyclic shift amount is changed according to a synchronization signal resource position, i.e., a shift amount of a time or frequency resource from a reference position.

Figure 2B:
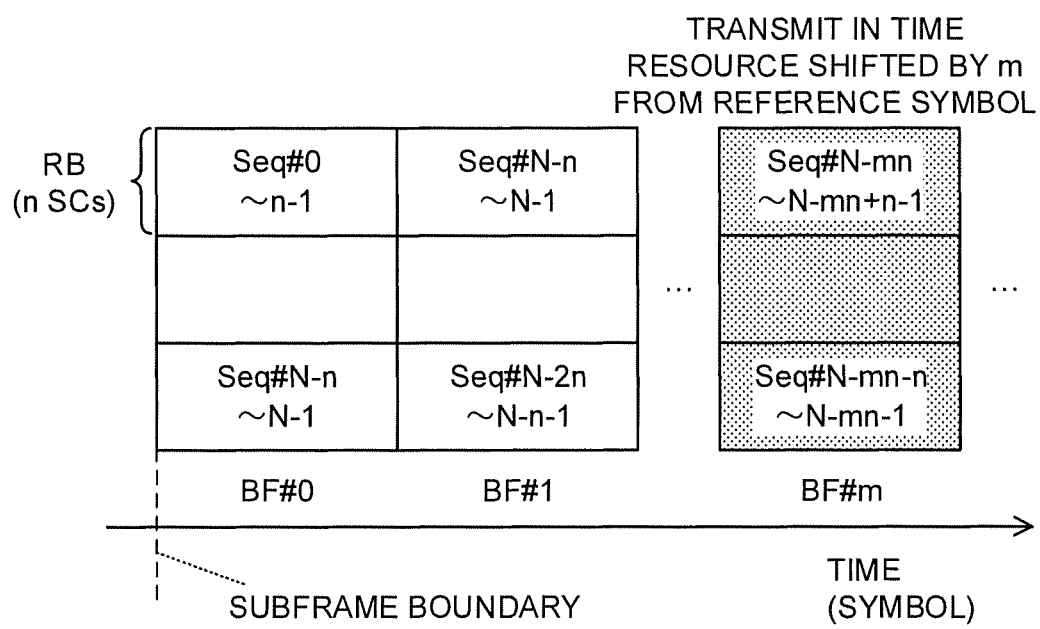
FIG. 2B is a diagram for explaining an embodiment 1-2.

As illustrated in FIG. 2B, when a synchronization signal is transmitted by a resource block (BF #0) at a subframe head, i.e., a reference symbol, the cyclic shift is not applied. In addition, the reference symbol in FIG. 2B is an example, and the reference symbol may not be the resource block at the subframe head.

As illustrated in FIG. 2B, when a synchronization signal is transmitted by a time resource shifted by m from the reference symbol (e.g., BF #0), cyclic shift corresponding to m is applied in resource block units. In this case, when one resource block includes n subcarriers, cyclic shift corresponding to n×m is applied. By receiving the synchronization signal to which the cyclic shift corresponding to m has been applied in the resource block units, a user terminal can recognize the synchronization signal resource position, i.e., a shift amount of the time resource from the reference position.

Embodiment 1-3

A combination of the embodiment 1-1 and the embodiment 1-2 is applied to notify shift amounts of time and frequency resources from a synchronization signal reference position.

For example, the embodiment 1-1 is applied to notify the shift amount of the frequency resource from the reference position. In addition, the embodiment 1-2 is applied to notify the shift amount of the time resource from the reference position. Consequently, the user can recognize the synchronization resource position transmitted by the flexible time and frequency resources.

In addition, the embodiment 1-1 may be applied to notify the shift amount of the time resource from the reference position. The embodiment 1-2 may be applied to notify the shift amount of the frequency resource from the reference position.

According to the first aspect, to obtain desired correlation characteristics in a resource block even when, for example, cyclic shift is applied in resource block units, a synchronization signal sequence may be a concatenated sequence of a plurality of sequences.

(Second Aspect)

According to the second aspect, by detecting a synchronization signal, and then receiving information (e.g., MIB) from a resource that is relatively apart by a known predetermined amount from a reference synchronization signal resource, a user terminal can recognize a resource position (a shift amount from a reference position) of both or one of the synchronization signal and a channel including this information of the synchronization signal from received information. That is, the user terminal is explicitly notified of the resource position by using a broadcast channel.

A resource from which the user terminal receives the information (e.g., MIB) is specified by, for example, a specification. When the received MIB includes resource position information of the MIB (e.g., a shift amount of a time or frequency resource from the reference position or an index), relative positions of the MIB and the synchronization signal are known, so that the user terminal can recognize the synchronization signal resource position.

Embodiment 2-1

Figure 3:
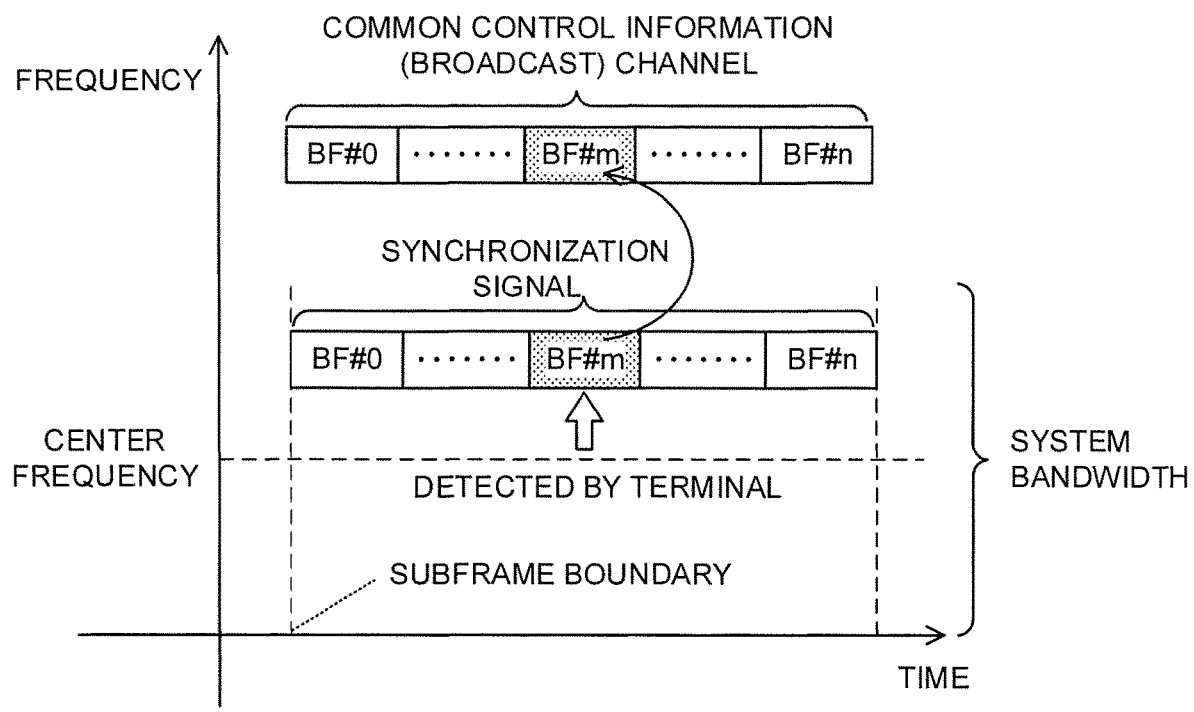
FIG. 3 is a diagram for explaining an embodiment 2-1.

As illustrated in FIG. 3, a user terminal detects a synchronization signal, and then receives a resource signal such as a common control information (broadcast) channel that is predetermined frequency resources apart from the detected synchronization signal. The user terminal recognizes a time index and a frequency index of both or one of the synchronization signal and a channel including common control information from the received common control information (broadcast) channel.

Embodiment 2-2

Figure 4:
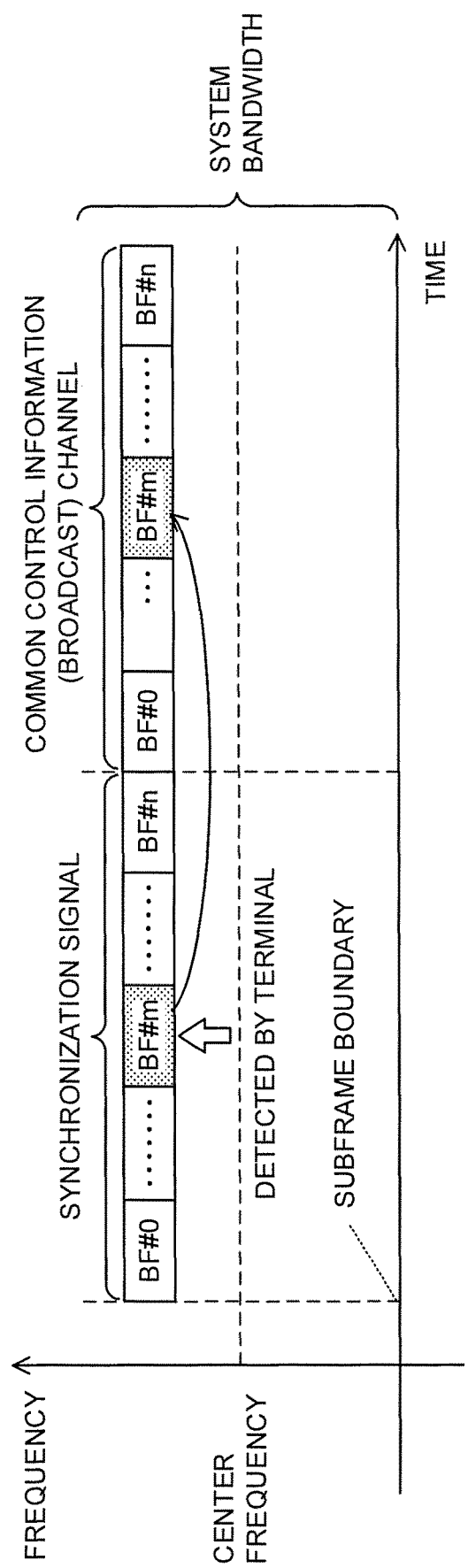
FIG. 4 is a diagram for explaining an embodiment 2-2.

As illustrated in FIG. 4, a user terminal detects a synchronization signal, and then receives a resource signal such as a common control information (broadcast) channel that is predetermined time resources apart from the detected synchronization signal. The user terminal recognizes a time index and a frequency index of both or one of the synchronization signal and a channel including common control information, from the received common control information (broadcast) channel.

Embodiment 2-3

Figure 5:
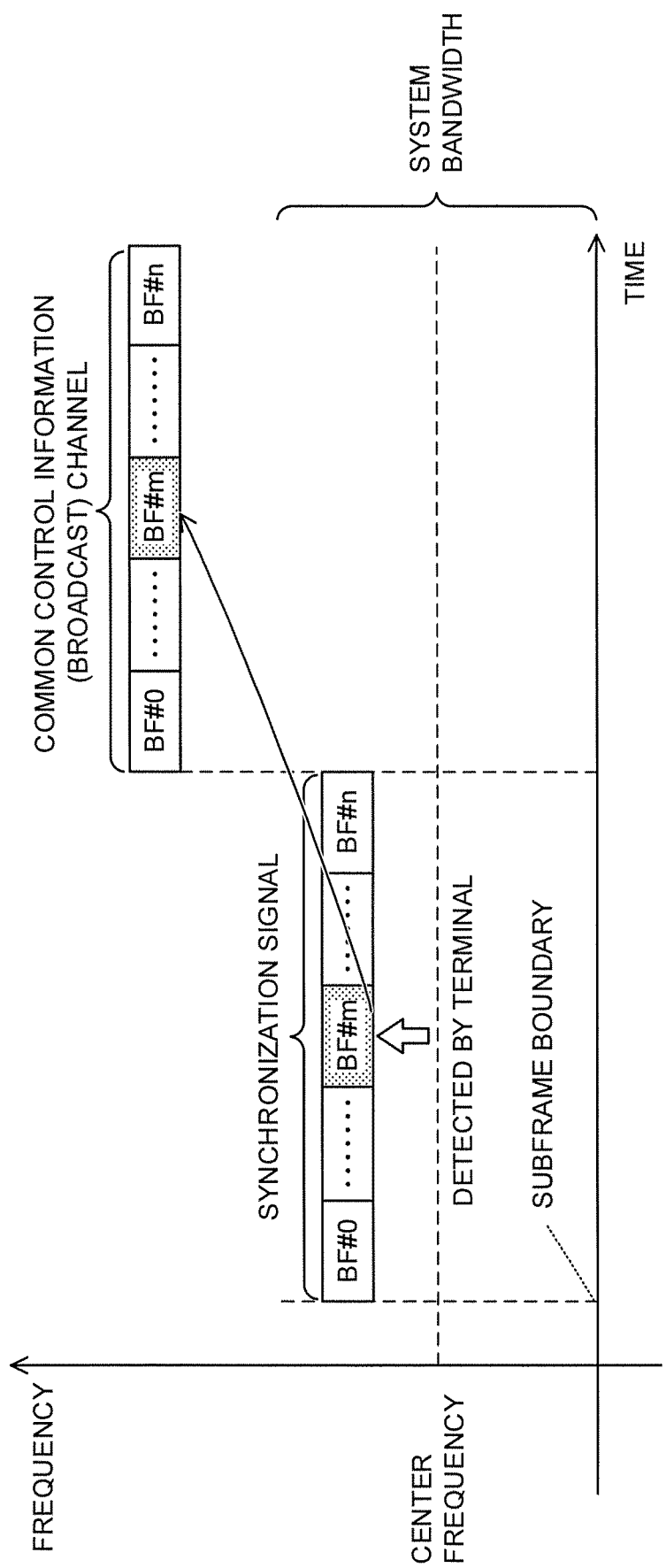
FIG. 5 is a diagram for explaining an embodiment 2-3.

As illustrated in FIG. 5, a user terminal detects a synchronization signal, and then receives a resource signal such as a common control information (broadcast) channel that is predetermined time resources and frequency resources apart from the detected synchronization signal. The user terminal recognizes a time index and a frequency index of both or one of the synchronization signal and a channel including common control information, from the received common control information (broadcast) channel.

According to the second aspect, as a reference signal used to demodulate the common control information (broadcast) channel including the information of both or one of the time resource index and the frequency resource index, a sequence that does not depend on a frequency resource to be mapped may be used. In this case, even if the user terminal does not know a resource index until obtaining the information included in the common control information (broadcast) channel, the user terminal can easily perform reception processing.

A time index and a frequency index of a synchronization signal resource position may be recognized or notified by different methods. For example, the time index of the synchronization signal resource position may be recognized or notified by the method according to the first aspect, and the frequency index may be recognized or notified by the method according to the second aspect. Alternatively, the frequency index of the synchronization signal resource position may be recognized or notified by the method according to the first aspect, and the time index may be recognized or notified by the method according to the second aspect.

(Third Aspect)

According to the third aspect, time and frequency resource groups that are a synchronization signal search range searched by a user terminal can be limited by a specification or signaling.

A frequency whose synchronization signal is searched by the user terminal may be on a predetermined channel raster that is a center frequency candidate of an NR carrier. Channel raster intervals of NR may be different from a channel raster (100 [kHz]) according to LTE. The channel raster may be arranged only on part of a band instead of an entire NR band.

The frequency whose synchronization signal is searched by the user terminal may be on a frequency that is added a predetermined offset from each channel raster. The "predetermined offset" may be different from an integer multiple of the channel raster interval. That is, a center resource at which the synchronization signal is transmitted may not be on the channel raster.

A connected (RRC Connected mode) user terminal may be notified of a measurement target frequency and information related to time and frequency resources whose synchronization signal is searched. A carrier that the user terminal has already connected with may be an LTE carrier or an NR carrier. For example, information such as MeasObject may include at least the measurement target frequency (carrier frequency) and synchronization signal resource information (a frequency shift amount and measurement timing information (periodicity and an observation window length)). Alternatively, whether or not there are a time shift and a frequency shift, i.e., whether or not it is necessary to search resources other than the reference resource may be configured per user terminal or per frequency measured by the user terminal.

(Configuration of Radio Communication System)

The configuration of the radio communication system according to one embodiment of the present invention will be described below. This radio communication system uses one or a combination of the radio communication methods according to the above aspects of the present invention to perform communication.

Figure 6:
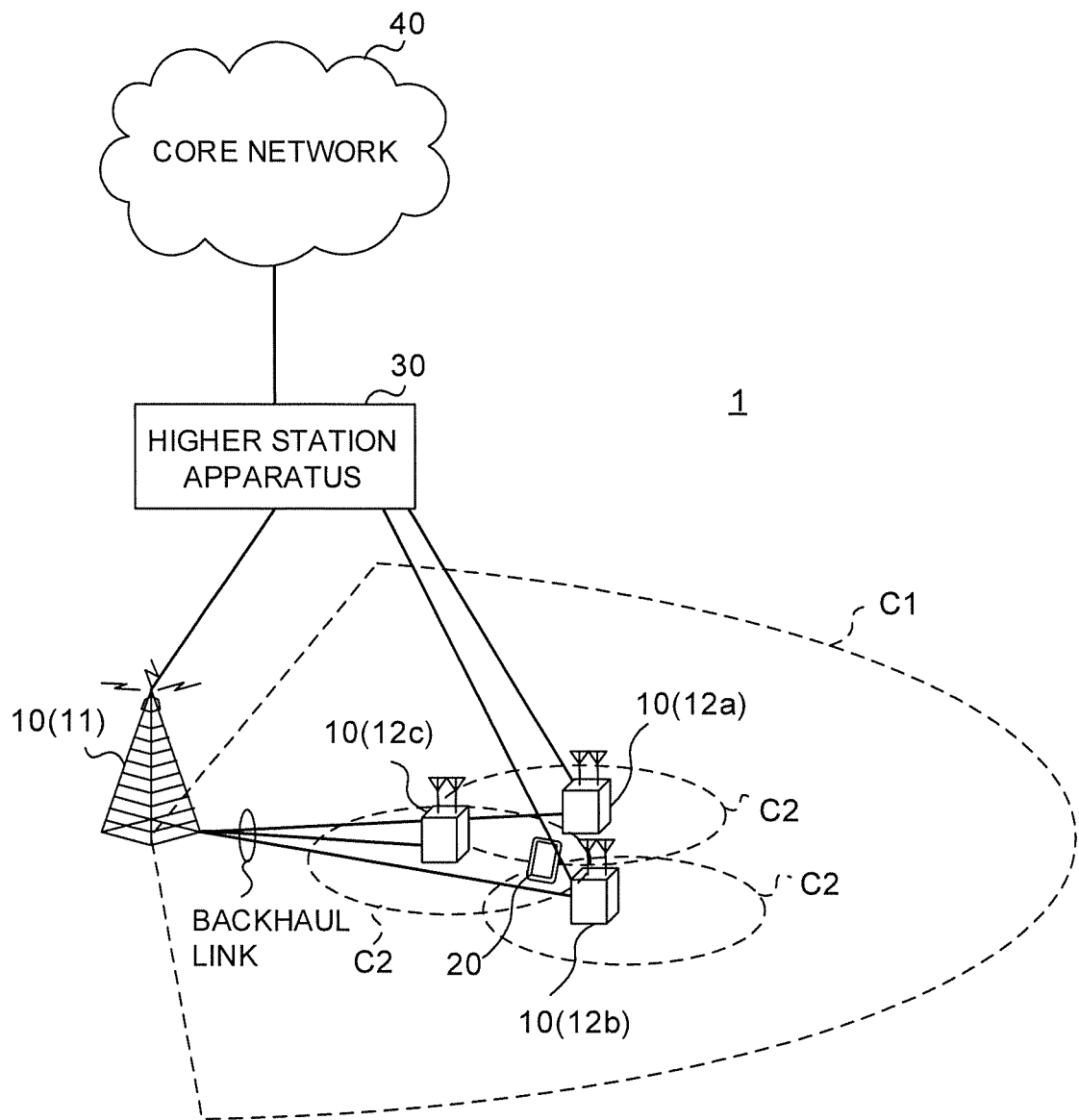
FIG. 6 is a diagram illustrating an example of a schematic configuration of a radio communication system according to one embodiment of the present invention.

FIG. 6 is a diagram illustrating an example of a schematic configuration of the radio communication system according to the one embodiment of the present invention. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and New Radio Access Technology (New-RAT), or a system that realizes these.

The radio communication system 1 illustrated in FIG. 6 includes a radio base station 11 that forms a macro cell C1 of a relatively wide coverage, and radio base stations 12 (12a to 12c) that are located in the macro cell C1 and form small cells C2 narrower than the macro cell C1. Further, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Further, the user terminal 20 can apply CA or DC by using a plurality of cells (CCs) (e.g., five CCs or less or six CCs or more).

The user terminal 20 and the radio base station 11 can communicate by using a carrier (an existing carrier that is called a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz or 5 GHz) or may use the same carrier as that used by the radio base station 11. In this regard, a configuration of the frequency band used by each radio base station is not limited to this.

In each cell (carrier), a single numerology may be applied or a plurality of different numerologies may be applied.

The radio base station 11 and each radio base station 12 (or the two radio base stations 12) can be configured to be connected by cables (e.g., optical fibers compliant with a Common Public Radio Interface (CPRI) or an X2 interface) or by radio.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Further, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Further, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or continuous resource blocks per terminal and causes a plurality of terminals to use different bands to reduce an interference between the terminals. In this regard, uplink and downlink radio access schemes are not limited to a combination of these and may be other radio access schemes.

The radio communication system 1 uses as downlink channels a downlink shared channel (PDSCH: Physical Downlink Shared Channel) shared by each user terminal 20, a broadcast channel (PBCH: Physical Broadcast Channel) and a downlink L1/L2 control channel. User data, higher layer control information and System Information Blocks (SIB) are transmitted on the PDSCH. Further, Master Information Blocks (MIB) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH) and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as uplink channels an uplink shared channel (PUSCH: Physical Uplink Shared Channel) shared by each user terminal 20, an uplink control channel (PUCCH: Physical Uplink Control Channel), and a random access channel (PRACH: Physical Random Access Channel). User data and higher layer control information are transmitted on the PUSCH. Further, downlink radio quality information (CQI: Channel Quality Indicator) and transmission acknowledgement information are transmitted on the PUCCH. A random access preamble for establishing connection with cells is transmitted on the PRACH.

The radio communication system 1 transmits as downlink reference signals a Cell-specific Reference Signal (CRS), a Channel State Information-Reference Signal (CSI-RS), a DeModulation Reference Signal (DMRS) and a Positioning Reference Signal (PRS). Further, the radio communication system 1 transmits a measurement reference signal (SRS: Sounding Reference Signal) and a DeModulation Reference Signal (DMRS) as uplink reference signals. In this regard, the DMRS may be referred to as a user terminal specific reference signal (UE-specific Reference Signal). Further, a reference signal to be transmitted is not limited to these.

(Radio Base Station)

Figure 7:
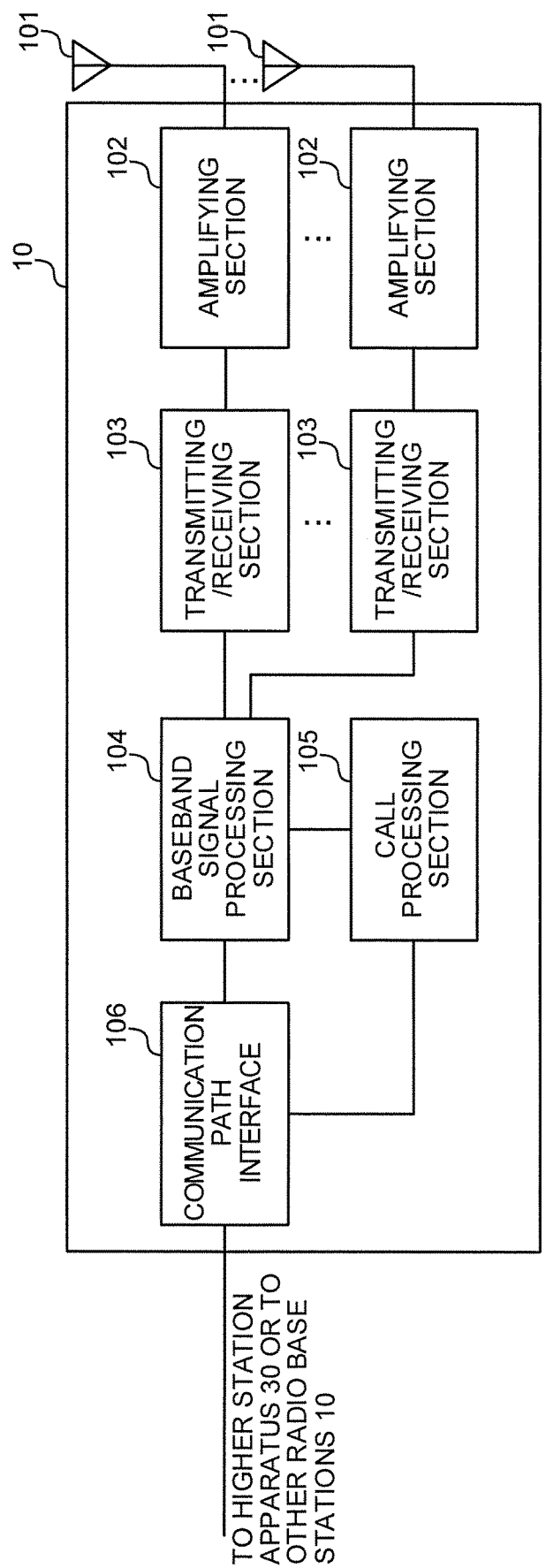
FIG. 7 is a diagram illustrating an example of an entire configuration of a radio base station according to the one embodiment of the present invention.

FIG. 7 is a diagram illustrating an example of an entire configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data to transfer to each transmission/reception section 103. Further, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from the baseband signal processing section 104, into a radio frequency band to transmit. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal to output to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal to transfer to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a predetermined interface. Further, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 transmits a DL signal (e.g., downlink control information and downlink data) to be transmitted to the user terminal. Each transmission/reception section 103 can include information for designating one of UL transmission (e.g., scheduling of UL data) and DL transmission (e.g., scheduling of DL data) in the downlink control information to transmit to the user terminal.

Figure 8:
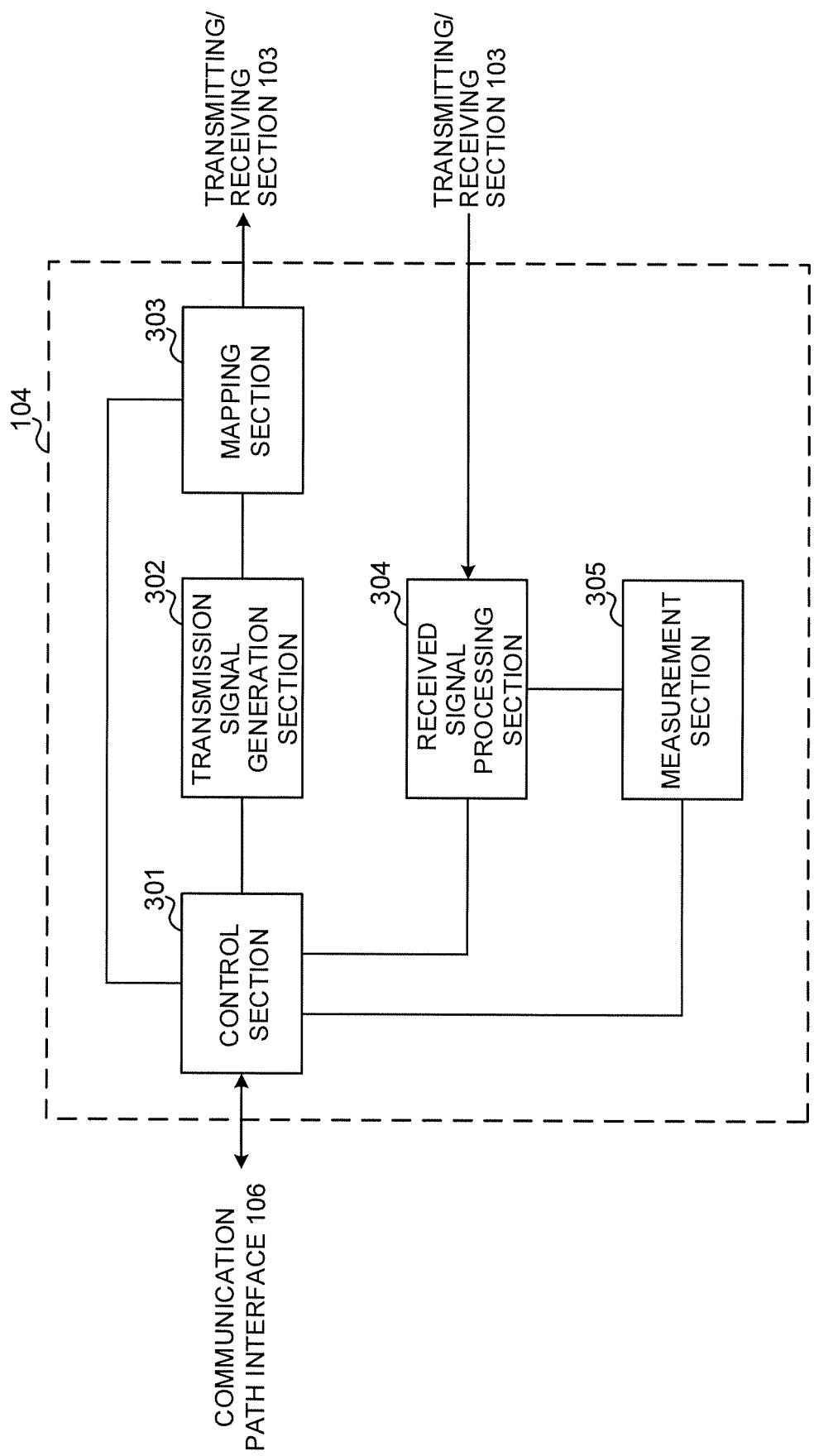
FIG. 8 is a diagram illustrating an example of a function configuration of the radio base station according to the one embodiment of the present invention.

FIG. 8 is a diagram illustrating an example of a function configuration of the radio base station according to the one embodiment of the present invention. In addition, FIG. 8 mainly illustrates function blocks of characteristic portions according to the present embodiment, and assumes that the radio base station 10 includes other function blocks required for radio communication, too. As illustrated in FIG. 8, the baseband signal processing section 104 includes at least a control section (scheduler) 301, a transmission signal generating section 302, a mapping section 303, a received signal processing section 304 and a measurement section 305.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Further, the control section 301 controls signal reception processing of the received signal processing section 304 and signal measurement of the measurement section 305.

The control section 301 controls scheduling (e.g., resource allocation) of system information, a downlink data signal transmitted on the PDSCH, and a downlink control signal transmitted on the PDCCH and/or the EPDCCH. Further, the control section 301 controls generation of a downlink control signal (e.g., transmission acknowledgement information) and a downlink data signal based on a result obtained by determining whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals such as a CRS, a CSI-RS and a DMRS.

Still further, the control section 301 controls scheduling of an uplink data signal transmitted on the PUSCH, an uplink control signal (e.g., transmission acknowledgement information) transmitted on the PUCCH and/or the PUSCH, a random access preamble transmitted on the PRACH and an uplink reference signal.

The transmission signal generating section 302 generates downlink signals (such as a downlink control signal, a downlink data signal and a downlink reference signal) based on an instruction from the control section 301 to output to the mapping section 303. The transmission signal generating section 302 can be composed of a signal generator, a signal generation circuit and a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Further, the transmission signal generating section 302 performs coding processing and modulation processing on a downlink data signal according to a code rate and a modulation scheme decided based on Channel State Information (CSI) from each user terminal 20.

The mapping section 303 maps the downlink signal generated by the transmission signal generating section 302, on a predetermined radio resource based on the instruction from the control section 301 to output to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Further, the received signal processing section 304 outputs a received signal and a signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ)), a Signal to Interference plus Noise Ratio (SINR)) or a channel state of the received signal. The measurement section 305 may output a measurement result to the control section 301.

(User Terminal)

Figure 9:
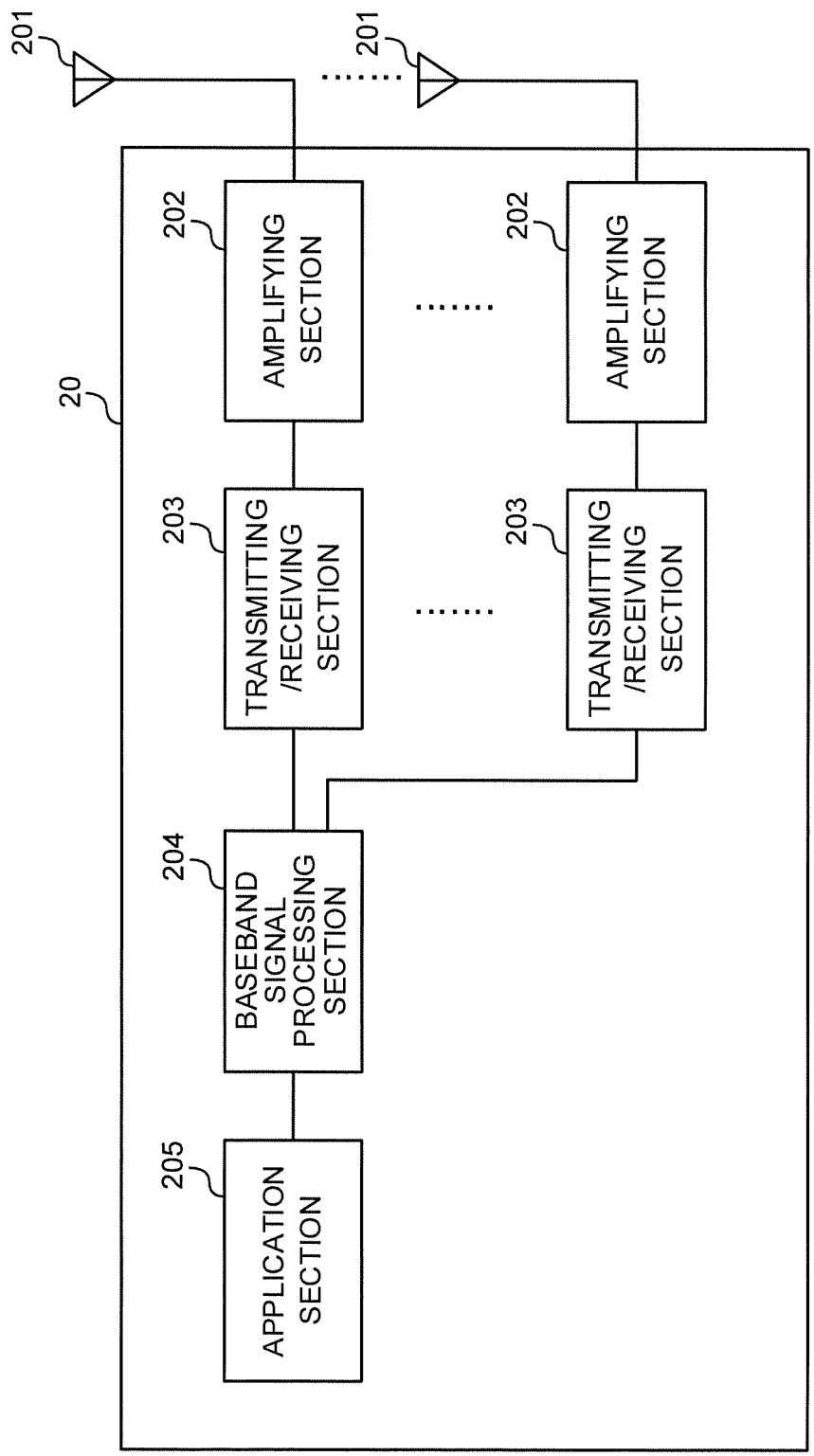
FIG. 9 is a diagram illustrating an example of an entire configuration of a user terminal according to the one embodiment of the present invention.

FIG. 9 is a diagram illustrating an example of an entire configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include the one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal to output to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and a MAC layer. Further, the baseband signal processing section 204 transfers broadcast information among the downlink data, too, to the application section 205.

Meanwhile, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data to transfer to each transmission/reception section 203. Each transmission/reception section 203 converts the baseband signal output from the baseband signal processing section 204 into a radio frequency band to transmit. The radio frequency signal subjected to the frequency conversion by each transmission/reception section 203 is amplified by each amplifying section 202, and is transmitted from each transmission/reception antenna 201.

In addition, each transmission/reception section 203 receives a synchronization signal (NR SS) and an MIB transmitted in flexible resources of the future radio communication systems (NR). The flexible resources refer to, for example, frequency resources other than the center of the system bandwidth. Alternatively, the flexible resources refer to, for example, a plurality of time resources in a case where an NR synchronization signal is transmitted by the multi-beam based approach.

Figure 10:
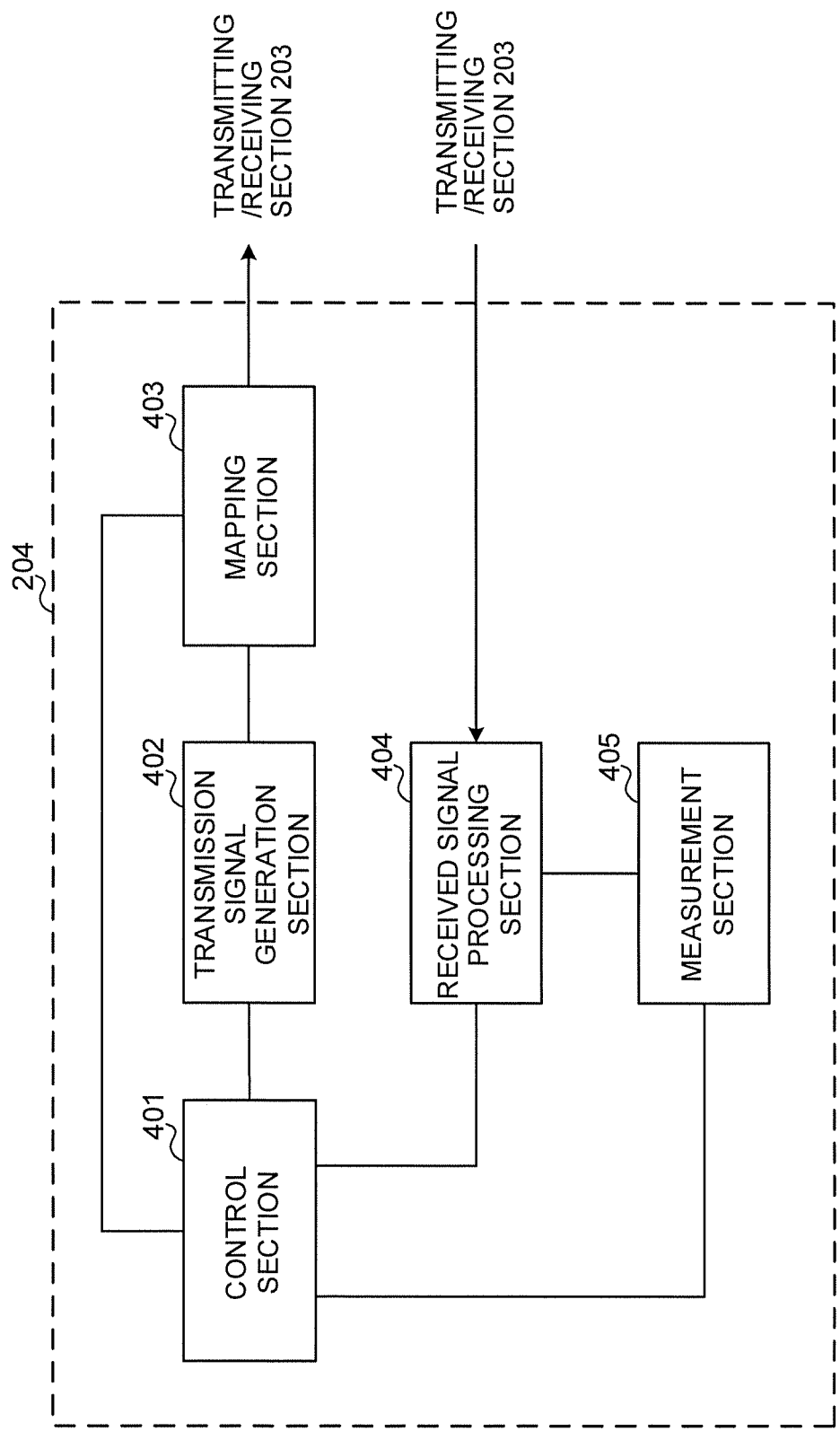
FIG. 10 is a diagram illustrating an example of a function configuration of the user terminal according to the one embodiment of the present invention.

FIG. 10 is a diagram illustrating an example of a function configuration of the user terminal according to the one embodiment of the present invention. In addition, FIG. 10 mainly illustrates function blocks of characteristic portions according to the present embodiment, and assumes that the user terminal 20 includes other function blocks required for radio communication, too. As shown in FIG. 10, the baseband signal processing section 204 of the user terminal 20 includes at least the control section 401, a transmission signal generating section 402, a mapping section 403, a received signal processing section 404 and a determination section 405.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Further, the control section 401 controls signal reception processing of the received signal processing section 404 and signal measurement of the determination section 405.

The control section 401 obtains, from the received signal processing section 404, downlink control signals (signals transmitted on the PDCCH/EPDCCH) and a downlink data signal (a signal transmitted on the PDSCH) transmitted from the radio base station 10. The control section 401 controls generation of an uplink control signal (e.g., transmission acknowledgement information) and an uplink data signal based on a result obtained by determining whether or not it is necessary to perform retransmission control on the downlink control signal and the downlink data signal.

The control section 401 recognizes a resource position at which the synchronization signal has been transmitted, based on the synchronization signal or the common control information (broadcast) channel received by each transmission/reception section 203. More specifically, the control section 401 recognizes the resource position at which the synchronization signal has been transmitted, based on a cyclic shift amount configured for the synchronization signal. Further, after each transmission/reception section 203 receives the synchronization signal, the control section 401 performs control to receive the common control information (broadcast) channel from a resource that is relatively apart by a predetermined amount from the resource on which the synchronization signal has been mapped, and recognizes the resource position at which the synchronization signal is transmitted, based on the common control information (broadcast) channel.

The transmission signal generating section 402 generates an uplink signal (such as an uplink control signal, an uplink data signal and an uplink reference signal) based on an instruction from the control section 401 to output to the mapping section 403. The transmission signal generating section 402 can be composed of a signal generator, a signal generation circuit and a signal generating apparatus described based on the common knowledge in the technical field according to the present invention.

For example, the transmission signal generating section 402 generates an uplink control signal related to transmission acknowledgement information and Channel State Information (CSI) based on, for example, the instruction from the control section 401. Further, the transmission signal generating section 402 generates an uplink data signal based on the instruction from the control section 401. When, for example, the downlink control signal notified from the radio base station 10 includes a UL grant, the control section 401 instructs the transmission signal generating section 402 to generate an uplink data signal.

The mapping section 403 maps the uplink signal generated by the transmission signal generating section 402, on a radio resource based on the instruction from the control section 401 to output to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (e.g., a downlink control signal transmitted from the radio base station or a downlink data signal transmitted on the PDSCH). The received signal processing section 404 outputs the information received from the radio base station 10 to the control section 401 and the determination section 405. The received signal processing section 404 outputs, for example, broadcast information, system information, RRC signaling and a DCI to the control section 401.

The received signal processing section 404 can be composed of a signal processor, a signal processing circuit or a signal processing apparatus, and a measurement instrument, a measurement circuit or a measurement apparatus described based on the common knowledge in the technical field according to the present invention. Further, the received signal processing section 404 can compose the reception section according to the present invention.

The determination section 405 performs retransmission control determination (ACK/NACK) based on a decoding result of the received signal processing section 404, and outputs a determination result to the control section 401. When a downlink signal (PDSCH) is transmitted from a plurality of CCs (e.g., six CCs or more), the determination section 405 can perform retransmission control determination (ACK/NACK) on each CC, and output each CC to the control section 401. The determination section 405 can be composed of a determination circuit or a determination apparatus described based on the common knowledge in the technical field according to the present invention.

(Hardware Configuration)

The block diagrams used to describe the embodiments illustrate blocks in function units. These function blocks (components) are realized by an arbitrary combination of hardware and/or software. Further, means for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (for example, via cables or by radio).

Figure 11:
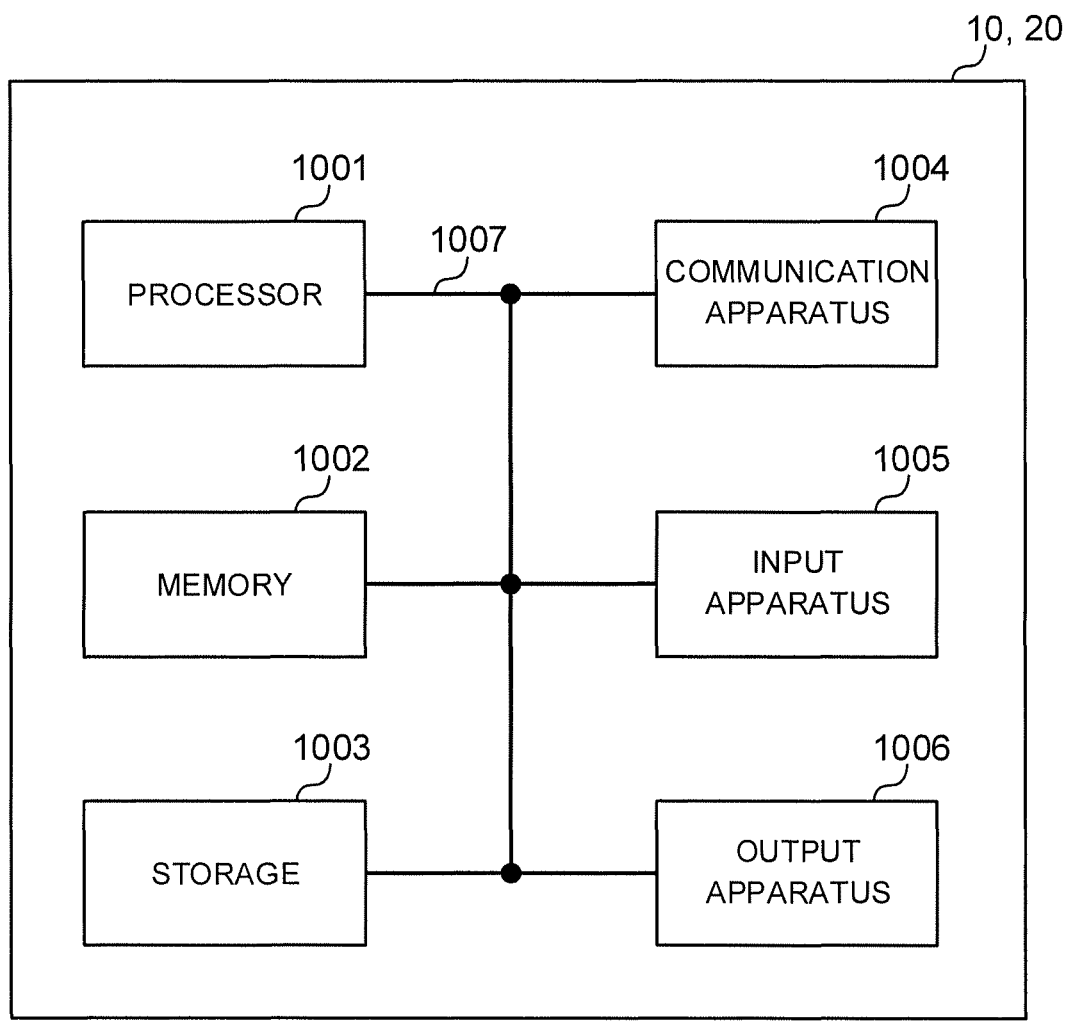
FIG. 11 is a diagram illustrating an example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 11 is a diagram illustrating an example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates only the one processor 1001. However, there may be a plurality of processors. Further, processing may be executed by one processor or may be executed by one or more processors concurrently, successively or by another method. In addition, the processor 1001 may be implemented by one or more chips.

Each function of the radio base station 10 and the user terminal 20 is realized by causing hardware such as the processor 1001 and the memory 1002 to read predetermined software (program), and thereby causing the processor 1001 to perform an arithmetic operation, and control communication of the communication apparatus 1004 and reading and/or writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the baseband signal processing section 104 (204) and the call processing section 105 may be realized by the processor 1001.

Further, the processor 1001 reads programs (program codes), a software module or data from the storage 1003 and/or the communication apparatus 1004 out to the memory 1002, and executes various types of processing according to the programs, the software module or the data. Programs that cause the computer to execute at least part of the operations described in the above embodiments are used as the programs. For example, the control section 401 of the user terminal 20 may be realized by a control program stored in the memory 1002 and operated by the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is, for example, a network device, a network controller, a network card and a communication module. For example, the transmission/reception antennas 101 (201), the amplifying sections 102 (202), the transmission/reception sections 103 (203) and the channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may employ an integrated configuration (e.g., touch panel).

Further, each apparatus such as the processor 1001 or the memory 1002 is connected by the bus 1007 that communicates information. The bus 1007 may be composed of a single bus or may be composed of buses that are different between apparatuses.

Further, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

Each term that is described in this description and/or each term that is necessary to understand this description may be replaced with terms having identical or similar meanings. For example, a channel and/or a symbol may be signals (signaling). Further, a signal may be a message. A reference signal can be also abbreviated as a RS (Reference Signal), or may be also referred to as a pilot or a pilot signal depending on standards to be applied. Furthermore, a Component Carrier (CC) may be referred to as a cell, a frequency carrier and a carrier frequency.

Still further, a radio frame may include one or a plurality of periods (frames) in a time domain. Each of one or a plurality of periods (frames) that composes a radio frame may be referred to as a subframe. Further, the subframe may include one or a plurality of slots in the time domain. Furthermore, the slot may include one or a plurality of symbols (Orthogonal Frequency Division Multiplexing (OFDM) symbols or Single Carrier Frequency Division Multiple Access (SC-FDMA) symbols) in the time domain.

All of the radio frame, the subframe, the slot and the symbol indicate time units for transmitting signals. The other corresponding names of the radio frame, the subframe, the slot and the symbol may be used. For example, one subframe may be referred to as a Transmission Time Interval (TTI). A plurality of continuous subframes may be referred to as TTIs. One slot may be referred to as a TTI. That is, the subframe or the TTI may be a subframe (1 ms) according to existing LTE, may be a period (e.g., 1 to 13 symbols) shorter than 1 ms or may be a period longer than 1 ms.

In this regard, the TTI refers to, for example, a minimum time unit for scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this. The TTI may be a transmission time unit of a data packet (transport block) subjected to channel coding, or may be a processing unit of scheduling or link adaptation.

The TTI having 1 ms in time duration may be referred to as a general TTI (TTIs according to LTE Rel. 8 to 12), a normal TTI, a long TTI, a general subframe, a normal subframe or a long subframe. A TTI shorter than the general TTI may be referred to as a shortened TTI, a short TTI, a shortened subframe or a short subframe.

Resource Blocks (RBs) are resource block allocation units of the time domain and the frequency domain, and may include one or a plurality of continuous subcarriers in the frequency domain. Further, the RB may include one or a plurality of symbols in the time domain or may have a length of one slot, one subframe or one TTI. One TTI or one subframe may include one or a plurality of resource blocks. In this regard, the RB may be referred to as a Physical Resource Block (PRB: Physical RB), a PRB pair or a RB pair.

Further, the resource block may include one or a plurality of Resource Elements (REs). For example, one RE may be a radio resource domain of one subcarrier and one symbol.

In this regard, structures of the radio frame, the subframe, the slot and the symbol are only exemplary structures. For example, configurations such as the number of subframes included in a radio frame, the number of slots included in a subframe, the numbers of symbols and RBs included in a slot, the number of subcarriers included in a RB, the number of symbols in a TTI, a symbol length and a Cyclic Prefix (CP) length can be variously changed.

Still further, the pieces of information and parameters described in this description may be expressed by absolute values, may be expressed by relative values with respect to predetermined values or may be expressed by other pieces of corresponding information. For example, a radio resource may be indicated by a predetermined index. Further, numerical expressions used for these parameters may be different from those explicitly disclosed in this description.

Names used in this description are by no means restrictive. Information elements such as various channels (the Physical Uplink Control Channel (PUCCH) and the Physical Downlink Control Channel (PDCCH)) can be identified based on various suitable names. Therefore, various names allocated to these various channels and information elements are by no means restrictive.

The pieces of information and the signals described in this description may be expressed by using one of various different techniques. For example, the data, the instructions, the commands, the pieces of information, the signals, the bits, the symbols and the chips mentioned in the above entire description may be expressed as voltages, currents, electromagnetic waves, magnetic fields or magnetic particles, optical fields, photons or arbitrary combinations thereof.

Further, the pieces of information and the signals can be output from a higher layer to a lower layer and/or from the lower layer to the higher layer. The pieces of information and the signals may be input and output via a plurality of network nodes.

The input and output pieces of information and signals may be stored in a specific location (e.g., memory) or may be managed by a management table. The input and output pieces of information and signals can be overwritten, updated or additionally written. The output pieces of information and signals may be deleted. The input pieces of information and signals may be transmitted to other apparatuses.

Information may be notified not only according to the aspects/embodiment described in this description but also by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations thereof.

In addition, the physical layer signaling may be referred to as Layer 1/Layer 2 (L1/L2) control information (L1/L2 control signal) or L1 control information (L1 control signal). Further, the RRC signaling may be referred to as an RRC message, and may be, for example, an RRC Connection Setup message or an RRC Connection Reconfiguration message. Furthermore, the MAC signaling may be notified by, for example, a MAC Control Element (MAC CE).

Still further, predetermined information (e.g., notification of "being X") may be not only explicitly notified but also implicitly notified (by, for example, not notifying this predetermined information or by notifying another information).

Determination may be performed based on a value (0 or 1) expressed by one bit, may be performed based on a boolean expressed by true or false or may be performed by comparing numerical values (e.g., comparison with predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Further, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "cell", "sector", "cell group", "carrier" and "component carrier" can be compatibly used. The base station is referred to as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each small area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is referred to as the term such as a fixed station, a NodeB, an eNodeB (eNB), an access point, a transmission point, a reception point, a femtocell or a small cell in some cases.

A person skilled in the art calls the mobile station as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Further, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the radio base station 10. Further, words such as "uplink" and "downlink" may be read as "sides". For example, the uplink channel may be read as a side channel.

Similarly, the user terminal in this description may be read as the radio base station. In this case, the radio base station 10 may be configured to include the functions of the user terminal 20.

In this description, specific operations performed by the base station are performed by an upper node of this base station depending on cases. It is obvious that, in a network including one or a plurality of network nodes of the base stations, various operations performed to communicate with a terminal can be performed by base stations or one or more network nodes (that are, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Further, orders of the processing procedures, the sequences and the flowchart of each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are enhanced based on these systems.

The phrase "based on" used in this description does not mean "based only on" unless specified otherwise. In other words, the phrase "based on" means both of "based only on" and "based at least on".

The term "determining (deciding)" used in this description includes diverse operations in some cases. For example, "determining (deciding)" may be regarded to "determine (decide)" "calculating", "computing", "processing", "deriving", "investigating", "looking up" (e.g., looking up in a table, a database or another data structure) and "ascertaining". Further, "determining (deciding)" may be regarded to "determine (decide)" "receiving" (e.g., receiving information), "transmitting" (e.g., transmitting information), "input", "output" and "accessing" (e.g., accessing data in a memory). Further, "determining (deciding)" may be regarded to "determine (decide)" "resolving", "selecting", "choosing", "establishing" and "comparing". That is, "determining (deciding)" may be regarded to "determine (decide)" some operation.

The words "connected" and "coupled" used in this description or every modification of these words can mean direct or indirect connection or coupling between two or more elements, and can include that one or more intermediate elements exist between the two elements "connected" or "coupled" with each other. The elements may be coupled or connected physically, logically or by a combination of physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description and the claims, these words intend to be comprehensive similar to the word "have". Further, the word "or" used in this description and the claims intends not to be exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for illustrative explanation, and does not have any restrictive meaning to the present invention.

This application claims priority to Japanese Patent Application No. 2016-133628 filed on Jul. 5, 2016, the entire contents of which are incorporated by reference herein.

The invention claimed is:

1. A terminal comprising:
a receiver that receives a synchronization signal, and receives a broadcast channel, in a resource located at a predetermined position relative to a resource for the synchronization signal; and
a processor that determines an index, which indicates a time resource for the synchronization signal and the broadcast channel, based on the broadcast channel,
wherein, in a Radio Resource Control (RRC) connected mode, the receiver receives measurement-object information that indicates a measurement frequency of the synchronization signal and a measurement timing of the synchronization signal.

2. The terminal according to claim 1, wherein the measurement timing includes a measurement periodicity and a time duration of a measurement window.

3. A radio communication method for a terminal, comprising:
receiving a synchronization signal, and receiving a broadcast channel, in a resource located at a predetermined position relative to a resource for the synchronization signal;
determining an index, which indicates a time resource for the synchronization signal and the broadcast channel, based on the broadcast channel; and
in a Radio Resource Control (RRC) connected mode, receiving measurement-object information that indicates a measurement frequency of the synchronization signal and a measurement timing of the synchronization signal.

4. A base station comprising:
a processor that controls the base station; and
a transmitter that transmits a synchronization signal, and transmits a broadcast channel, in a resource located at a predetermined position relative to a resource for the synchronization signal,
wherein an index, which indicates a time resource for the synchronization signal and the broadcast channel, is based on the broadcast channel, and
wherein, in a Radio Resource Control (RRC) connected mode, the transmitter transmits measurement-object information that indicates a measurement frequency of the synchronization signal and a measurement timing of the synchronization signal.

5. A system comprising a base station and a terminal, wherein:
the base station comprises:
a transmitter that transmits a synchronization signal, and transmits a broadcast channel; and
the terminal comprises:
a receiver that receives the synchronization signal, and receives the broadcast channel, in a resource located at a predetermined position relative to a resource for the synchronization signal; and
a processor that determines an index, which indicates a time resource for the synchronization signal and the broadcast channel, based on the broadcast channel,
wherein, in a Radio Resource Control (RRC) connected mode, the receiver receives measurement-object information that indicates a measurement frequency of the synchronization signal and a measurement timing of the synchronization signal.

* * * * *